April 16, 1957 C. G. SMITH 2,789,258

INTRINSIC COATINGS FOR SEMICONDUCTOR JUNCTIONS

Filed June 29, 1955

INVENTOR
CHARLES G. SMITH
BY Elmer J. Gorn
ATTORNEY

United States Patent Office 2,789,258

Patented Apr. 16, 1957

2,789,258

INTRINSIC COATINGS FOR SEMICONDUCTOR JUNCTIONS

Charles G. Smith, Weston, Mass., assignor to Raytheon Manufacturing Company, Waltham, Mass., a corporation of Delaware Application June 29, 1955, Serial No. 518,778

10 Claims. (Cl. 317—239)

This invention relates generally to semiconductive bodies containing adjacent regions of different electrical conductivity type material forming a junction or boundary therebetween, and more particularly to a novel method and means of constructing such bodies whereby electrical leakage which may occur across the junction is substantially eliminated.

The electrical characteristics of semiconductive materials such as silicon and germanium are largely determined by small traces of impurities or slight mechanical defects which are present on the surface or within the bodies of the materials. A pure crystal of silicon or germanium is made up of a cubic lattice in which each atom has four valence electrons, all of which are bound in the lattice. The presence of what are termed "significant impurities" alters the electrical nature of the region. The impurities are two different types, those designated "donor" impurities which, upon replacing an atom in a crystal lattice, supply more than the four needed electrons, and those designated "acceptor" impurities which supply less than the needed four electrons. The former type supplies unbonded electrons which serve as negative mobile charge carriers, and the latter, electron deficiencies or "holes" which serve as positive mobile charge carriers. A semiconductive material in which conduction by "holes" normally occurs is identified as P type, whereas the type in which the principal conduction occurs by electrons is identified as N type.

Various methods of producing semiconductive crystals having adjacent regions of P-type and N-type material are known in the art. These crystals, with the subsequent attachment of conducting leads or electrodes, may then be utilized as diodes, transistors, phototransistors, and other semiconductive devices. However, in the past, unwanted electrical leakage across the junction between N and P type regions has hampered the realization of the full potential of these devices. Although the effect is imperfectly understood at present, it is believed that the objectionable current leakage is a surface phenomenon in which a kind of short circuit over the surface of the crystal and across the junction is produced. At a surface, the energy levels in a solid are quite different from those in the bulk material, and current theory tends toward the view that the nature of these surface energy levels is the cause of many of the surface troubles encountered in semiconductor work.

Accordingly, the present invention is directed toward a novel method and means for eliminating or mitigating the effect of current leakage across the junction in a semiconductive body. Applicant has discovered that, by covering the surface area of the junction with a layer of intrinsic material, the leakage effect is substantially corrected, and the production of quieter, longer-lived transistors and diodes capable of withstanding higher back voltages with less back current is greatly facilitated.

The invention will be better understood as the following description proceeds, taken in conjunction with the accompanying drawing wherein.

Figure 1:
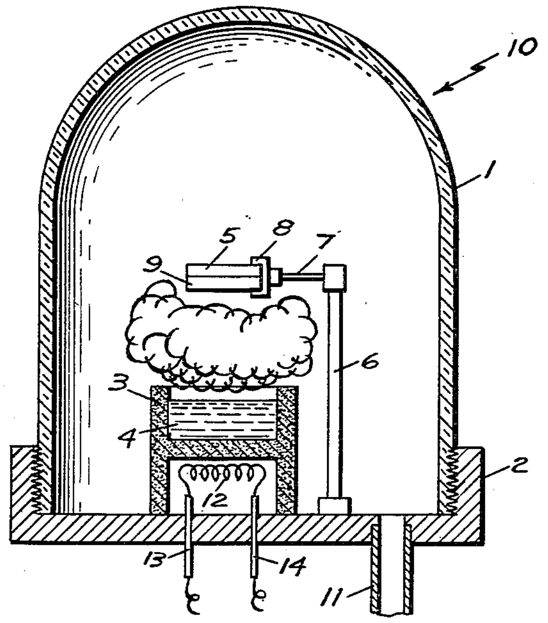
Fig. 1 is a diagrammatic representation of one method of applying the intrinsic coating to the junction.
Figure 2:
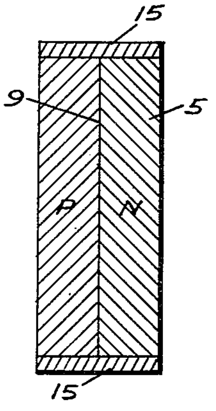
Fig. 2 is a greatly enlarged cross-sectional view of a semiconductive chip showing the coating over the junction.

Referring now to the drawing, and more particularly to Fig. 1 thereof, there is shown one method of carrying out the principles of the present invention. Numeral 10 represents generally a conventional bell-jar apparatus comprising a cover 1 of glass or other material, attached in air-tight relation to a bottom portion 2. A crucible 3, preferably of graphite, is positioned in the bell-jar, and a charge of intrinsic or pure semiconductive material 4, such as germanium, for example, is placed therein. As used in this specification, the term "intrinsic material" is defined to be semiconductive material whose electrical properties are essentially characteristic of the pure, ideal crystal, as distinguished from extrinsic semiconductive material whose electrical properties are dependent upon significant impurities contained in the material.

A semiconductive body or chip 5, having adjacent regions of different electrical conductivity type material forming a junction therebetween, may be placed above the crucible 3 and supported by any suitable means, such as a rod 6 having an arm 7, and a clip 8. Body 5 may be prepared by methods well known in the art, as by growing a crystal from a melt of semiconductive material, for example, germanium, which is alternately supplied with impurity elements to convert the melt from N type to P type, or vice-versa, and thereby form a P–N junction in the grown crystal. The crystal may then be cut into chips, subjected to a suitable chemical etch, and cleaned. Thus, each of the chips will have a P–N junction 9 within its structure.

With body 5 in position, bell-jar 10 may be evacuated through pipe 11, and melt 4 may be heated by means of a filament 12 connected by insulated electrodes 13 and 14 to a suitable voltage supply. The melt is raised to a temperature sufficient to vaporize it whereby the vaporized germanium is deposited on body 5, and across the junction 9, forming a coating or layer 15 of intrinsic material. The layer 15 has been found to be crystalline, and in effect becomes an integral part of the chip 5.

Figure 3:
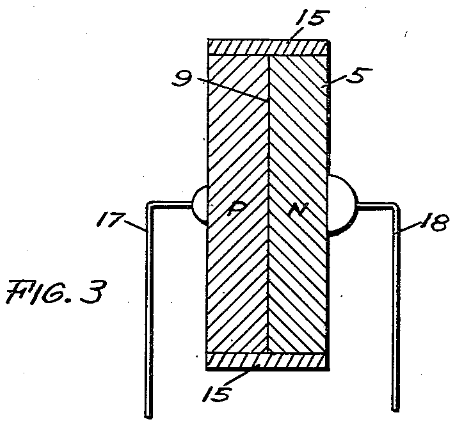
Fig. 3 is a greatly enlarged cross-sectional view of the diode in accordance with the invention.

After the coating 15 has been applied, the body 5 may then be supplied with conducting leads to produce the desired semiconductive device. Fig. 3 shows one form of such a device in which leads 17 and 18 are attached to the P and N portions of body 5 by any suitable means, such as solder, to constitute a semiconductive diode.

Although there has been described what is considered to be a preferred embodiment of the present invention, various adaptations and modifications thereof may be made. For example, the intrinsic coating may be applied across the junction in other ways than by vapor deposition, and a transistor having three adjacent regions of different electrical conductivity-type material could be fabricated as easily as a diode. In addition, the semiconductive body could be silicon in which an intrinsic coating of silicon covers the junction. It is, therefore, desired that the appended claims be given a broad interpretation commensurate with the scope of the invention within the art.

What is claimed is:

1. A semiconductive body selected from the group consisting of germanium and silicon having a P–N junction therein, said junction being covered by a layer of intrinsic material of the same kind as said body.

2. A semiconductive body selected from the group consisting of germanium and silicon having a P–N junction therein, said junction being covered by a layer of intrinsic material of the same kind as said body.

3. A germanium body having a P–N junction therein, said junction being covered by a layer of intrinsic germanium.

4. A silicon body having a P–N junction therein, said junction being covered by a layer of intrinsic silicon.

5. A semiconductive device comprising a body of semiconductive material selected from the group consisting of germanium and silicon having a P–N junction therein, a layer of intrinsic material of the same kind as said body covering said junction, and leads electrically attached to said body.

6. A semiconductive device comprising a body of germanium having a P–N junction therein, a layer of intrinsic germanium covering said junction, and leads electrically attached to said body.

7. A semiconductive device comprising a body of silicon having a P–N junction therein, a layer of intrinsic silicon covering said junction, and leads electrically attached to said body.

8. A semiconductive body selected from the group consisting of germanium and silicon having regions of different electrical conductivity type material therein, the junction between said regions being covered by a layer of intrinsic material of the same kind as said body.

9. A semiconductive body selected from the group consisting of germanium and silicon having adjacent N-type and P-type regions therein, the junction between said regions being covered by a layer of intrinsic material of the same kind as said body.

10. A semiconductive body selected from the group consisting of germanium and silicon having adjacent N-type and P-type regions therein, the surface areas of the junction between said regions being covered by a layer of intrinsic material of the same kind as said body.

References Cited in the file of this patent

UNITED STATES PATENTS 2,623,105 Shockley et al. ---------- Dec. 23, 1952